(12) United States Patent
Tsubaki et al.

(10) Patent No.: US 11,244,792 B2
(45) Date of Patent: Feb. 8, 2022

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Kazuyo Saito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/889,314

(22) Filed: Jun. 1, 2020

(65) Prior Publication Data

US 2020/0294730 A1    Sep. 17, 2020

Related U.S. Application Data

(63) Continuation of application No. PCT/JP2018/047167, filed on Dec. 21, 2018.

(30) Foreign Application Priority Data

Dec. 28, 2017    (JP) .............................. JP2017-254980

(51) Int. Cl.
*H01G 11/60*    (2013.01)
*H01G 11/48*    (2013.01)
(Continued)

(52) U.S. Cl.
CPC ............... *H01G 11/48* (2013.01); *H01G 9/07* (2013.01); *H01G 11/24* (2013.01); *H01G 11/60* (2013.01)

(58) Field of Classification Search
None
See application file for complete search history.

(56) References Cited

U.S. PATENT DOCUMENTS

| | | | | |
|---|---|---|---|---|
| 7,746,623 B2 * | 6/2010 | Murakami | ............. | C25D 11/26 361/523 |
| 9,208,954 B2 * | 12/2015 | Matsuura | ............... | H01G 11/60 |

(Continued)

FOREIGN PATENT DOCUMENTS

CN    104471661 A    3/2015
JP    62-145713    6/1987
(Continued)

OTHER PUBLICATIONS

International Search Report of PCT application No. PCT/JP2018/047167 dated Mar. 5, 2019.
(Continued)

*Primary Examiner* — Dion R. Ferguson
(74) *Attorney, Agent, or Firm* — McDermott Will & Emery LLP

(57) ABSTRACT

An electrolytic capacitor includes an anode body, a dielectric layer disposed on a surface of the anode body, a solid electrolyte layer that is in contact with the dielectric layer, and an ion conductor that is liquid at room temperature. The solid electrolyte layer includes a conductive polymer. The ion conductor includes a solvent, an acid component, and a base component. The content proportion of the solvent in the ion conductor is more than 10% by mass and less than or equal to 60% by mass. The total content proportion of the acid component and the base component in the ion conductor is more than or equal to 40% by mass and less than 90% by mass. A melting point of the ion conductor is lower than or equal to −10° C.

12 Claims, 1 Drawing Sheet

(51) Int. Cl.
*H01G 9/07* (2006.01)
*H01G 11/24* (2013.01)

(56) References Cited

U.S. PATENT DOCUMENTS

| | | | |
|---|---|---|---|
| 2002/0067589 A1* | 6/2002 | Marshall | H01G 9/022 |
| | | | 361/503 |
| 2009/0021894 A1* | 1/2009 | Ning | H01G 11/52 |
| | | | 361/527 |
| 2010/0238608 A1 | 9/2010 | Dreissig et al. | |
| 2011/0211294 A1 | 9/2011 | Ueda | |
| 2012/0300368 A1 | 11/2012 | Matsuura et al. | |
| 2015/0213962 A1 | 7/2015 | Koseki et al. | |
| 2016/0064151 A1* | 3/2016 | Matsuura | H01G 11/04 |
| | | | 361/506 |
| 2017/0294273 A1* | 10/2017 | Andoralov | H01G 11/30 |
| 2018/0119306 A1* | 5/2018 | Tsubaki | H01G 9/151 |
| 2018/0158619 A1* | 6/2018 | Tsubaki | H01G 9/0036 |
| 2018/0197685 A1* | 7/2018 | Tsubaki | H01G 9/0036 |
| 2018/0226204 A1* | 8/2018 | Toader | H01G 9/0425 |
| 2018/0323015 A1* | 11/2018 | Andoralov | H01G 11/48 |
| 2019/0006111 A1* | 1/2019 | Tsubaki | H01G 9/035 |
| 2019/0013152 A1* | 1/2019 | Aoyama | H01G 9/028 |

FOREIGN PATENT DOCUMENTS

| | | |
|---|---|---|
| JP | 2003-022938 | 1/2003 |
| JP | 2006-165001 | 6/2006 |
| JP | 2007-080888 | 3/2007 |
| JP | 2010-226112 | 10/2010 |
| JP | 2011-181610 | 9/2011 |
| JP | 2014-063915 | 4/2014 |
| JP | 2017-069537 | 4/2017 |
| WO | 2011/099261 | 8/2011 |

OTHER PUBLICATIONS

English Translation of Chinese Office Action dated Aug. 6, 2021 for the related Chinese Patent Application No. 201880083059.8.

* cited by examiner

ELECTROLYTIC CAPACITOR

RELATED APPLICATIONS

This application is a continuation of the PCT International Application No. PCT/JP2018/047167 filed on Dec. 21, 2018, which claims the benefit of foreign priority of Japanese patent application No. 2017-254980 filed on Dec. 28, 2017, the contents all of which are incorporated herein by reference.

BACKGROUND

1. Technical Field

The present disclosure relates to an electrolytic capacitor including a solid electrolyte layer that contains a conductive polymer.

2. Description of the Related Art

As a small-sized, large capacitance capacitor with low equivalent series resistance (ESR), an electrolytic capacitor including an anode body formed with a dielectric layer, and a solid electrolyte layer formed so as to cover at least a part of the dielectric layer is promising.

Unexamined Japanese Patent Publication No. 2003-22938 discloses the use of an organic acid onium salt as an electrolyte in order to increase the voltage resistance of the electrolytic capacitor.

SUMMARY

An electrolytic capacitor according to one aspect of the present disclosure includes an anode body, a dielectric layer disposed on a surface of the anode body, a solid electrolyte that is in contact with the dielectric layer, and an ion conductor that is liquid at room temperature. The solid electrolyte layer includes a conductive polymer. The ion conductor includes a solvent, an acid component, and a base component. The content proportion of the solvent in the ion conductor is more than 10% by mass and less than or equal to 60% by mass. The total content proportion of the acid component and the base component in the ion conductor is more than or equal to 40% by mass and less than 90% by mass. A melting point of the ion conductor is lower than or equal to $-10°$ C.

According to the present disclosure, an electrolytic capacitor having excellent low-temperature characteristics can be provided.

DETAILED DESCRIPTION OF EMBODIMENT

Figure 1:
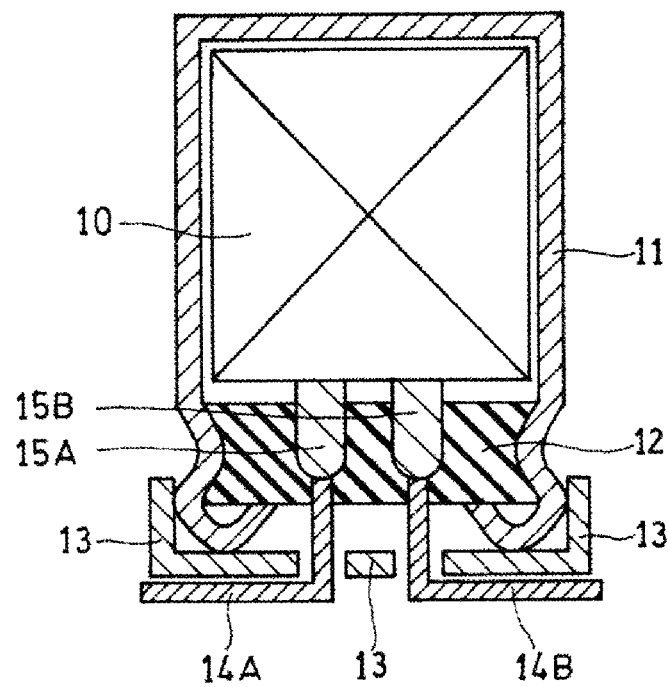
FIG. 1 is a schematic cross-sectional view illustrating an electrolytic capacitor according to an exemplary embodiment of the present disclosure.

Unexamined Japanese Patent Publication No. 2003-22938 proposes that in the case of using an electrolytic solution including an organic acid onium salt and a solvent, the a proportion of the solvent in the electrolytic solution is made small to be less than or equal to 10% by mass. However, in the electrolytic solution described in Unexamined Japanese Patent Publication No. 2003-22938, since the amount of the solvent is small, the electrolytic solution may coagulate in a low-temperature environment, thus causing deterioration in the low-temperature characteristics of the electrolytic capacitor.

An electrolytic capacitor according to the present disclosure includes an anode body, a dielectric layer disposed on a surface of the dielectric layer, a solid electrolyte layer that is in contact with the dielectric layer, and an ion conductor that is liquid at room temperature. The solid electrolyte layer includes a conductive polymer. The ion conductor contains a solvent, an acid component, and a base component. The content proportion of the solvent in the ion conductor is more than 10% by mass and less than or equal to 60% by mass. The total content proportion of the acid component and the base component in the ion conductor is more than or equal to 40% by mass and less than 90% by mass. A melting point of the ion conductor is lower than or equal to $-10°$ C.

When the content proportion of the solvent in the ion conductor is more than 10% by mass (the total content proportion of the acid component and the base component in the ion conductor is less than 90% by mass), and a melting point of the ion conductor is lower than or equal to $-10°$ C., the coagulation of the ion conductor in a low-temperature environment is suppressed. And thus the low-temperature characteristics of the electrolytic capacitor can be improved. For example, a decrease in capacitance due to the coagulation of the ion conductor in the low-temperature environment and a decrease in repairing ability of the dielectric layer can be suppressed. Further, a capacitance appearance ratio in a low-temperature environment (e.g., at $-55°$ C.) is increased. The melting point of the ion conductor is preferably lower than or equal to $-40°$ C., more preferably lower than or equal to $-55°$ C.

In the electrolytic capacitor including the above ion conductor, the repairing ability of the dielectric layer is improved, and the voltage resistance is improved.

When the total content proportion of the acid component and the base component in the ion conductor is more than or equal to 40% by mass (the content proportion of the solvent in the ion conductor is less than or equal to 60% by mass), a number of dissociated anions (anions derived from the acid component) increases. Thus, the effect of improving the repairing ability of the dielectric layer can be sufficiently exhibited.

From the viewpoint of improving the low-temperature characteristics, the content proportion of the solvent in the ion conductor ranges preferably from 11% by mass to 60% by mass, inclusive, more preferably from 20% by mass to 60% by mass, inclusive, and further preferably from 40% by mass to 60% by mass, inclusive. The total content proportion of the acid component and the base component in the ion conductor ranges preferably from 40% by mass to 89% by mass, inclusive, more preferably from 40% by mass to 80% by mass, inclusive, and further preferably from 40% by mass to 60% by mass, inclusive.

Acid Component and Base Component

Preferably, the acid component includes a carboxylic acid, and the base component includes an amidine compound. Further, preferably, the acid component includes sulfonic acid, and the base component includes at least one selected from the group consisting of amine compounds (primary amine, secondary amine, tertiary amine) and an amidine compound.

A salt including the above acid component and the above base component can be present as a liquid at room temperature (24° C.) in a state of a neutralized salt. And the salt hardly educes in a low-temperature environment even when it is included at a high concentration in the ion conductor. Hence, the coagulation of the ion conductor is further suppressed, and the low-temperature characteristics of the electrolytic capacitor are further improved.

Even when the solvent decreases due to evaporation and permeation through a sealing member to the outside of the electrolytic capacitor, the salt including the acid component and the base component can remain as a liquid. And thus the solid electrolyte is sufficiently covered with the ion conductor. This can suppress deterioration of the solid electrolyte layer (conductive polymer) due to moisture and oxygen that contact with the solid electrolyte layer in accordance with a decrease in the solvent. Hence, a decrease in the life of the electrolytic capacitor caused by the deterioration of the solid electrolyte layer can be suppressed. Even when the solvent decreases due to heat applied from the outside of the electrolytic capacitor or heat generated by a ripple current, the presence of the acid component and the base component suppresses the deterioration in the solid electrolyte layer. Hence, heat resistance and resistance to the ripple current are also improved.

In a case where the acid component includes a carboxylic acid and the base component includes an amidine compound or some other case, it is preferable that a molar ratio of the acid component in the ion conductor is greater than a molar ratio of the base component in the ion conductor, and a pH of the ion conductor is less than or equal to 4.5. In this case, de-doping of a dopant included in the solid electrolyte layer from the conductive polymer is suppressed, and an increase in ESR caused by the de-doping of the dopant is suppressed.

In the case where the acid component includes a carboxylic acid and the base component includes an amidine compound or some other case, it is preferable that a content proportion of the base component in the ion conductor is more than or equal to 10% by mass, and a content proportion of the acid component in the ion conductor is more than or equal to 30% by mass. In this case, the de-doping of the dopant included in the solid electrolyte layer from the conductive polymer is suppressed, and an increase in ESR caused by the de-doping of the dopant is suppressed.

In a case where the acid component includes a sulfonic acid and the base component includes at least one of an amine compound and an amidine compound, it is preferable that a molar ratio of the acid component in the ion conductor is equal to or greater than a molar ratio of the base component in the ion conductor, and a pH of the ion conductor is less than 7.0. In this case, the de-doping of the dopant included in the solid electrolyte layer from the conductive polymer is suppressed, and an increase in ESR caused by the de-doping of the dopant is suppressed.

The carboxylic acid preferably includes an aromatic carboxylic acid having two or more carboxyl groups (aromatic dicarboxylic acid). Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. Among them, aromatic dicarboxylic acids such as phthalic acid (ortho form) and maleic acid are more preferred. The carboxyl group of the aromatic dicarboxylic acid is stable and hardly causes a side reaction. Hence, the effect of stabilizing the conductive polymer is exhibited over a long period of time. This is advantageous in prolonging the life of the electrolytic capacitor. Phthalic acid (ortho form) is more preferred from the viewpoints of the repairing ability and thermal stability of the dielectric layer.

Further, the carboxylic acid may be an aliphatic carboxylic acid such as adipic acid.

Examples of the sulfonic acid include aromatic sulfonic acids such as benzenesulfonic acid, alkylbenzenesulfonic acid (e.g., toluenesulfonic acid), naphthalenesulfonic acid, and alkylnaphthalenesulfonic acid (e.g., ethylnaphthalenesulfonic acid and butylnaphthalenesulfonic acid) or an aliphatic sulfonic acid such as an alkylsulfonic acid (e.g., methanesulfonic acid or ethanesulfonic acid). Among them, naphthalenesulfonic acid and 1,4-naphthalenedisulfonic acid are preferred from the viewpoints of the repairing ability of the dielectric layer and the thermal stability of the molecular structure. When the sulfonic acid has an alkyl group, a carbon number of the alkyl group is preferably from 1 to 10, inclusive.

Carboxylic acid is thermally decomposed in a very high-temperature environment such as at the time of reflow to generate carbon dioxide gas. This may cause a sealing part of the capacitor to bulge. On the other hand, sulfonic acid does not generate carbon dioxide gas as described above. In this regard, use of sulfonic acid is advantageous in a very high-temperature environment such as at the time of reflow.

Examples of the amine compound (primary to tertiary amines) include, for example, methylamine, dimethylamine, trimethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These may be used alone or in combination of two or more. Among them, tertiary amines are preferable, and in particular, triethylamine and monoethyldimethylamine are preferred.

The amidine compound is a compound having an alkyl-substituted amidine group and includes, for example, a cyclic amidine compound or a quaternary compound of the cyclic amidine compound (amidinium compound). Specific examples include 1,2,3,4-tetramethylimidazolinium, 1-ethyl-2,3-dimethylimidazolinium, and 1-ethyl-3-methyl-imidazolium.

Solvent

From the viewpoint of improving the low-temperature characteristics of the electrolytic capacitor, the melting point of the solvent is preferably lower than or equal to −10° C. In this case, the melting point of the ion conductor is easily adjusted to be lower than or equal to −10° C.

The solvent preferably includes at least one glycol compound of an alkylene glycol and a polyalkylene glycol because the melting point of the solvent is easily adjusted to be lower than or equal to −10° C. The glycol compound does not easily permeate the sealing member of the electrolytic capacitor, so that the evaporation of the solvent to the outside of the electrolytic capacitor is suppressed. And thus the deterioration in the solid electrolyte layer (conductive polymer) due to the evaporation of the solvent is suppressed. Further, the decrease in the life of the electrolytic capacitor caused by the deterioration of the solid electrolyte layer is suppressed. Even when heat is applied from the outside of the electrolytic capacitor, such as reflow, or heat is generated by a ripple current, the evaporation of the solvent to the outside of the electrolytic capacitor is suppressed. Hence, heat resistance and resistance to the ripple current are also improved.

From the viewpoint of reducing the permeation of the sealing member, a carbon number of the alkylene glycol is preferably less than or equal to 5. From the viewpoint of improving the low-temperature characteristics of the electrolytic capacitor and reducing the evaporation of the solvent, the alkylene glycol preferably includes at least one of propylene glycol (melting point lower than or equal to −50° C.) and butylene glycol (melting point lower than or equal to −50° C.). Further, the alkylene glycol may include ethylene glycol (melting point of −12.9° C.).

From the viewpoint of improving the low-temperature characteristics of the electrolytic capacitor and reducing the evaporation of the solvent, the polyalkylene glycol preferably includes a copolymer of ethylene glycol (EG) and propylene glycol (PG). The number-average molecular weight of the copolymer of ethylene glycol and propylene glycol ranges, for example, from 88 to 5,000, inclusive. A mass ratio of propylene glycol to ethylene glycol, which are used as monomers constituting the copolymer, ranges preferably from 10 parts by mass to 10,000 parts by mass, inclusive, with respect to 100 parts by mass of ethylene glycol.

Further, the polyalkylene glycol may include polyethylene glycol, polypropylene glycol, and the like. The number-average molecular weight of polyethylene glycol is, for example, less than or equal to 300. The number-average molecular weight of the polypropylene glycol ranges, for example, from 102 to 5,000, inclusive.

From the viewpoint of improving the low-temperature characteristics of the electrolytic capacitor and reducing the evaporation of the solvent, it is preferable to use the above glycol compound as a main solvent. A content proportion of the glycol compound in the solvent is preferably more than or equal to 20% by mass, and more preferably more than or equal to 40% by mass.

The solvent may includes other components such as a sulfone compound, a lactone compound, and a carbonate compound, in addition to the glycol compound. As the sulfone compound, sulfolane, dimethyl sulfoxide, diethyl sulfoxide, and the like can be used. As the lactone compound, γ-butyrolactone, γ-valerolactone, and the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like can be used.

The ion conductor may include water in a proportion of more than 1% by mass and less than 10% by mass. When the content proportion of water in the ion conductor is more than 1% by mass, the repairing ability of the dielectric layer is ensured. When the content proportion of water in the ion conductor is less than 10% by mass, corrosion of the anode body and the like are suppressed. The content proportion of water in the ion conductor is more preferably more than 1% by mass and less than or equal to 5% by mass.

The conductive polymer contained in the solid electrolyte layer is a π-conjugated conductive polymer, and is preferably polypyrrole, polythiophene, polyaniline, or the like. In the present specification, polypyrrole, polythiophene, polyaniline, and the like mean polymers having basic skeletons of polypyrrole, polythiophene, polyaniline, and the like, respectively. Hence, polypyrrole, polythiophene, polyaniline, and the like may include their respective derivatives. For example, polythiophene includes poly(3,4-ethylenedioxythiophene) (PEDOT) that is the derivative of polythiophene, and the like. These may be used alone or in combination of two or more, and may be a copolymer of two or more monomers. The weight-average molecular weight of the conductive polymer is not particularly limited, but ranges, for example, from 1,000 to 100,000, inclusive. The solid electrolyte layer may further include a dopant.

Hereinafter, the present disclosure will be described more specifically based on an exemplary embodiment. However, the following exemplary embodiment does not limit the present disclosure.

Figure 2:
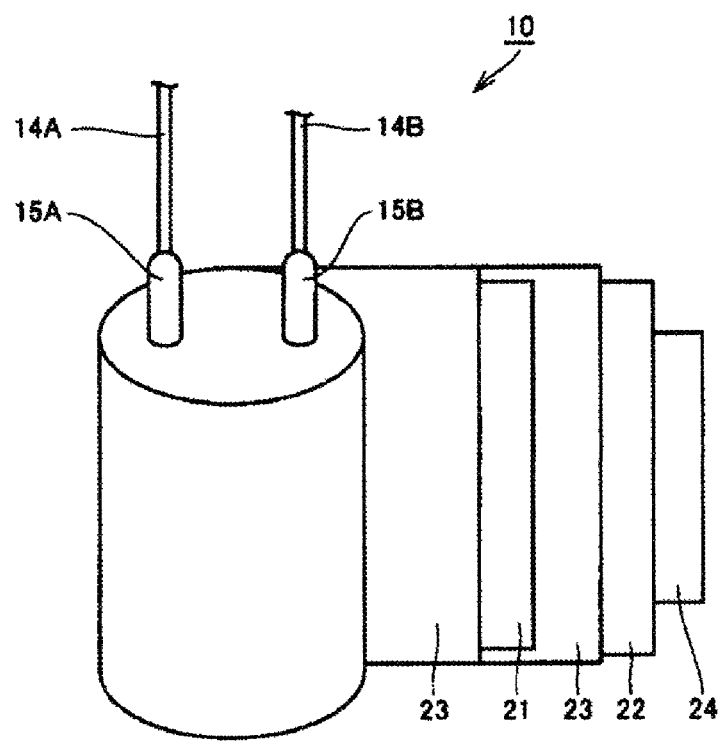
FIG. 2 is a schematic configuration for explaining a configuration of a capacitor element according to the same exemplary embodiment.

FIG. 1 is a schematic cross-sectional view illustrating an electrolytic capacitor according to the present exemplary embodiment, and FIG. 2 is a schematic view in which a part of a capacitor element according to the electrolytic capacitor is developed.

The electrolytic capacitor includes, for example, capacitor element 10, bottomed case 11 that houses capacitor element 10, sealing member 12 that seals an opening of bottomed case 11, and seat plate 13 that covers sealing member 12. Further, the electrolytic capacitor includes: lead wires 14A, 14B that are led out of sealing member 12 and penetrates seat plate 13; lead tabs 15A, 15B that connect the lead wires and the electrodes of capacitor element 10; and an ion conductor (not illustrated). The vicinity of the open end of bottomed case 11 is drawn inward, and the open end is curled to swage sealing member 12.

Capacitor element 10 is formed from a wound body as illustrated in FIG. 2. The wound body includes anode body 21 connected to lead tab 15A, a cathode body 22 connected to lead tab 15B, and separator 23. The wound body is a semi-finished product in which no solid electrolyte layer is formed between anode body 21 and cathode body 22.

Anode body 21 and cathode body 22 are wound with separator 23 interposed between anode body 21 and cathode body 22. The outermost periphery of the wound body is fixed with winding tape 24. Note that FIG. 2 illustrates a partially unfolded state before the outermost periphery of the wound body is fixed. As a material of separator 23, for example, it is possible to use a nonwoven fabric mainly composed of cellulose, polyethylene terephthalate, vinylon, aramid fiber, or the like.

Anode body 21 includes a metal foil with its surface roughened so as to have irregularities, and a dielectric layer is formed on the metal foil having irregularities. By attaching a conductive polymer to at least a part of the surface of the dielectric layer, a solid electrolyte layer is formed. The solid electrolyte layer may cover at least a part of a surface of cathode body 22 and/or a surface of separator 23. Capacitor element 10 on which the solid electrolyte layer is formed is housed into bottomed case 11 together with an electrolytic solution.

Hereinafter, an example of a method for manufacturing the electrolytic capacitor according to the present exemplary embodiment will be described step by step.

(i) Step of Preparing Anode Body 21 on Which a Dielectric Layer is Formed

First, a metal foil, which is a raw material for anode body 21, is prepared. The type of metal is not particularly limited, but it is preferable to use a valve metal such as aluminum, tantalum, or niobium, or an alloy containing the valve metal, from the viewpoint that the dielectric layer can be formed easily.

Next, the surface of the metal foil is roughened. By the roughening, a plurality of irregularities are formed on the surface of the metal foil. The roughening is preferably performed by etching the metal foil. The etching treatment may be performed by, for example, a direct-current electrolyzing method or an alternating-current electrolyzing method.

Next, a dielectric layer is formed on the surface of the roughened metal foil. The formation method is not particularly limited, but the dielectric layer can be formed by performing anodizing treatment on the metal foil. In the anodizing treatment, for example, the metal foil is immersed into an anodizing solution, such as an ammonium adipate solution, and subjected to heat treatment. The metal foil may be immersed into an anodizing solution, and a voltage may be applied.

Usually, from the viewpoint of mass productivity, the roughening treatment and the anodizing treatment are performed on a large-sized foil (metal foil) such as a valve metal. In that case, anode body 21 is prepared by cutting the foil after the treatment into a desired size.

(ii) Step of Preparing Cathode Body 22

As cathode body 22, a metal foil can be used similarly to the anode body. The type of metal is not particularly limited, but it is preferable to use a valve metal such as aluminum, tantalum, or niobium, or an alloy containing the valve metal. The surface of cathode body 22 may be roughened as needed.

(iii) Production of Wound Body

Next, a wound body is produced using anode body 21 and cathode body 22.

First, anode body 21 and cathode body 22 are wound with separator 23 interposed between anode body 21 and cathode body 22. At this time, the winding is performed while lead tabs 15A, 15B are wound, so that lead tabs 15A, 15B can be erected from the wound body as illustrated in FIG. 2.

As a material of separator 23, for example, a nonwoven fabric mainly composed of natural cellulose, synthetic cellulose, polyethylene terephthalate, vinylon, aramid fiber or the like can be used.

A material of lead tabs 15A, 15B is not particularly limited either, but may be a conductive material. A material of lead wires 14A, 14B connected to respective lead tabs 15A, 15B are also not particularly limited, but may be a conductive material.

Next, winding tape 24 is disposed on the outer surface of cathode body 22 located at the outermost layer in wound body constituted by anode body 21, cathode body 22, and separator 23. And the end of cathode body 22 is fixed with winding tape 24. When anode body 21 is prepared by cutting a large-sized metal foil, the anodizing treatment may be further performed on the wound body in order to form the dielectric layer on a cutting surface of anode body 21.

(iv) Step of Forming Capacitor Element 10

Next, the dielectric layer is impregnated with the polymer dispersion to form a film covering at least a part of the dielectric layer. The polymer dispersion includes a liquid component and a conductive polymer dispersed in the liquid component. The polymer dispersion may be a solution in which the conductive polymer is dissolved in the liquid component, or may be a dispersion in which conductive polymer particles are dispersed in the liquid component. Next, the liquid component is volatilized from the formed film by drying to form a dense solid electrolyte layer covering at least a part of the dielectric layer. In the polymer dispersion, since the conductive polymer particles are uniformly distributed in the liquid component, formation of a uniform solid electrolyte layer is facilitated. In this way, capacitor element 10 is produced.

The polymer dispersion can be prepared by, for example, a method of dispersing the conductive polymer in the liquid component, a method of polymerizing a precursor monomer in the liquid component to generate particles of the conductive polymer, or some other method. Examples of a preferable polymer dispersion include poly(3,4-ethylenedioxythiophene) (PEDOT) doped with polystyrenesulfonic acid (PSS), that is, PEDOT/PSS.

The liquid component may be water, a mixture of water and a non-aqueous solvent, or a non-aqueous solvent. The non-aqueous solvent is not particularly limited, and for example, a protic solvent and an aprotic solvent can be used. Examples of the protic solvent include alcohols such as methanol, ethanol, propanol, butanol, ethylene glycol, and propylene glycol, and ethers such as formaldehyde and 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

As a method of applying the polymer dispersion to the surface of the dielectric layer, for example, a method of immersing the wound body into the polymer dispersion contained in a container is simple and preferred. The immersion time ranges, for example, from one second to five hours, preferably from one minute to 30 minutes, depending on the size of the wound body. It is preferable to perform the impregnation under reduced pressure in an atmosphere ranging, for example, from 10 kPa to 100 kPa, and preferably from 40 kPa to 100 kPa. After the wound body is pulled up from the polymer dispersion, the wound body is dried, for example, at temperature ranging from 50° C. to 300° C., and more preferably from 100° C. to 200° C.

The step of applying the polymer dispersion to the surface of the dielectric layer and the step of drying the wound body may be repeated two or more times. By performing these steps a plurality of times, the coverage of the dielectric layer with the solid electrolyte layer can be increased. At this time, the solid electrolyte layer may be formed not only on the surface of the dielectric layer but also on the surfaces of cathode body 22 and separator 23.

As described above, a solid electrolyte layer is formed between anode body 21 and cathode body 22, and capacitor element 10 is produced. Note that the solid electrolyte layer formed on the surface of the dielectric layer functions as a practical cathode material.

(v) Step of Preparing Ion Conductor and Impregnating Capacitor Element 10 with Ion Conductor Next, after an acid component and a base component are dissolved in a solvent to prepare an ion conductor, capacitor element 10 is impregnated with the ion conductor. A method for impregnating capacitor element 10 with the ion conductor is not particularly limited. For example, a method in which capacitor element 10 is immersed into the ion conductor contained in a container is simple and preferred. The immersion time ranges, for example, from one second to five minutes, depending on the size of capacitor element 10. It is preferable to perform the impregnation under reduced pressure in an atmosphere ranging, for example, from 10 kPa to 100 kPa, and preferably from 40 kPa to 100 kPa.

(vi) Step of Sealing Capacitor Element

Next, capacitor element 10 is sealed. Specifically, first, capacitor element 10 is housed into bottomed case 11 such that lead wires 14A, 14B are located at an upper surface where bottomed case 11 opens. As a material of bottomed case 11, a metal such as aluminum, stainless steel, copper, iron, or brass, or an alloy of these metals can be used.

Next, sealing member 12, which is configured to allow lead wires 14A, 14B penetrate, is disposed above capacitor element 10. And capacitor element 10 is sealed in bottomed case 11 by sealing member 12. Next, the vicinity of the open end of bottomed case 11 is subjected to horizontal drawing, and the open end is curled to swage sealing; member 12. Then, by disposing seat plate 13 on the curled portion, the electrolytic capacitor as illustrated in FIG. 1 is completed. Thereafter, aging treatment may be performed while a rated voltage is applied.

Although the winding type electrolytic capacitor has been described in the above embodiment, the scope of application of the present disclosure is not limited to the above. The present disclosure can also be applied to other electrolytic capacitors, for example, a chip type electrolytic capacitor using a metal sintered body, and a laminated electrolytic capacitor using a metal plate as an anode body.

EXAMPLES

Hereinafter, the present disclosure will be described in more detail based on an example, but the present disclosure is not limited to the example.

Electrolytic Capacitor A1

A wound electrolytic capacitor (Φ(diameter) of 10.0 mm and L (length) of 10.0 mm) having a rated voltage of 25 V and rated capacitance of 330 μF was produced. Hereinafter, a specific method for manufacturing the electrolytic capacitor will be described.

Preparation of Anode Body

Etching treatment was performed on an aluminum foil having a thickness of 105 μm to roughen the surface of the aluminum foil. Thereafter, a dielectric layer was formed on the surface of the aluminum foil by anodizing treatment. The anodizing treatment was performed by immersing the aluminum foil into an ammonium adipate solution and applying a voltage of 45 V to the aluminum foil. Thereafter, the aluminum foil was cut so as to have a length of 5.3 mm and a width of 180 mm to prepare an anode body.

Preparation of Cathode Body

Etching treatment was performed on an aluminum foil having a thickness of 50 μm to roughen the surface of the aluminum foil. Thereafter, the aluminum foil was cut into a length of 5.3 mm and a width of 180 mm to prepare a cathode body.

Production of Wound Body

An anode lead tab and a cathode lead tab were connected to the anode body and the cathode body, respectively, and the anode body and the cathode body were wound with a separator interposed between the anode body and the cathode body while the lead tabs were being wound. An anode lead wire and a cathode lead wire were connected to the ends of the respective lead tabs projecting from the wound body. Then, the formed wound body was subjected to the anodizing treatment again to form a dielectric layer on the cutting end of the anode body. Next, the end of the outer surface of the wound body was fixed with wrapping tape to produce a wound body.

Preparation of Polymer Dispersion 3,4-ethylenedioxythiophene and polystyrenesulfonic acid (PSS, weight-average molecular weight of 100,000), which was a polymer dopant, were dissolved in ion-exchanged water (liquid component) to prepare a mixed solution. While the mixed solution is stirred, iron (iii) sulfate (oxidizing agent) dissolved in the ion-exchanged water was added to cause a polymerization reaction. After the reaction, the obtained reaction liquid was dialyzed to remove unreacted monomers and excess oxidizing agent, and a polymer dispersion containing poly(3,4-ethylenedioxythiophene) doped with about 5% by mass of PSS (PEDOT/SS) was obtained.

Formation of Solid Electrolyte Layer

In an atmosphere with reduced pressure (40 kPa), the wound body was immersed into the polymer dispersion contained in a predetermined container for five minutes, and thereafter, the wound body was pulled up from the polymer dispersion. Next, the wound body impregnated with the polymer dispersion was dried in a drying furnace at 150° C. for 20 minutes to form a solid electrolyte layer covering at least a part of the dielectric layer, thereby obtaining a capacitor element.

Preparation of Ion Conductor

An ion conductor containing a solvent, an acid component, and a base component was prepared. Propylene glycol was used as a solvent. Phthalic acid was used as the acid component, and 1,2,3,4-tetramethylimidazolinium was used as the base component. The content proportion of the solvent in the ion conductor was 11% by mass, and the total content proportion of the acid component and the base component in the ion conductor was 89% by mass. The molar ratio (acid component/base component) of the acid component to the base component was 2.5. At least a part of the acid component was added as a salt with the base component. The pH of the ion conductor was 4.5, and the melting point of the ion conductor was lower than or equal to −10° C.

Impregnation of Ion Conductor

In an atmosphere with reduced pressure (40 kPa), the capacitor element was immersed into the ion conductor for five minutes to impregnate the capacitor element with the ion conductor.

Sealing of Capacitor Element

The capacitor element impregnated with the ion conductor was sealed to complete electrolytic capacitor A1. Specifically, the capacitor element was housed in a bottomed case such that the lead wires are located at the opening side of the bottomed case. And a sealing member (an elastic material containing butyl rubber as a rubber component) having been formed so as to allow the lead wires penetrate was disposed above the capacitor element, to seal the capacitor element in the bottomed case. Then, the vicinity of the open end of bottomed case was subjected to drawing, the open end was further curled, and a seat plate was disposed on the curled portion, thereby completing electrolytic capacitor A1 as illustrated in FIG. 1. Thereafter, aging treatment was performed at 100° C. for two hours while a voltage of 39V was applied.

Evaluation (a) Measurement of Low-Temperature Capacitance Appearance Ratio in Initial Stage Capacitance C1 of the capacitor element after the formation of the solid electrolyte layer and before the impregnation of the ion conductor was measured in an aqueous solution of ammonium adipate at 15% by mass in an environment of temperature 30° C. Capacitance C2 of electrolytic capacitor A1 after the aging treatment was measured in an environment of temperature −55° C.

Using capacitance C1 and capacitance C2 which are measured above, a low-temperature capacitance appearance ratio in the initial stage was determined by the following equation:

Low-temperature capacitance appearance ratio in initial stage (%)=(C2/C1)×100

When the low-temperature capacitance appearance ratio in the initial stage was more than or equal to 70%, the low-temperature characteristics in the initial stage were evaluated as preferable.

(b) Measurement of Low-Temperature Capacitance Appearance Ratio After High-Temperature Holding Electrolytic capacitor A1 after the aging treatment was held in a high-temperature environment at 145° C. for 4000 hours. Capacitance C3 of electrolytic capacitor A1 after the holding in the high-temperature environment was measured in an environment of temperature −55° C.

Using capacitance C3 measured above and capacitance C1 measured in (a) step above, a low-temperature capacitance appearance ratio after the high-temperature holding was determined by the following equation:

Low-temperature capacitance appearance ratio (%) after high-temperature holding=(C3/C1)×100

When the low-temperature capacitance appearance ratio after the high-temperature holding was more than or equal to 30%, low-temperature characteristics after the high-temperature holding were evaluated as preferable. For the low-temperature capacitance appearance ratio after the high-temperature holding, the measurement is performed under severe conditions in which the solvent tends to decrease compared to the measurement of the low-temperature capacitance appearance ratio in the initial stage.

(c) Measurement of Discharge Voltage of Ion Conductor (Evaluation of Voltage Resistance)

Using an aluminum foil for high-voltage (area of 10 cm$^2$) subjected to the etching treatment and the anodizing treatment as the anode and using an aluminum foil (area of 10 cm$^2$) having a flat surface as the cathode, the anode and the cathode were immersed in the ion conductor to produce a sample for evaluating the voltage resistance of the ion conductor. At temperature of 25° C., a constant current method (2 mA) was applied between the electrodes of the sample, and a change in voltage over time was measured. A voltage at which continuous sparking or scintillation began to be observed was determined as the discharge voltage of the ion conductor. In Table 1, a case where the discharge voltage of the ion conductor was more than 100 V was indicated as "OK," and a case where the discharge voltage of the ion conductor was less than or equal to 100 V was indicated as "NO."

Electrolytic Capacitors A2 to A8, B1 to B3

An ion conductor containing a solvent, an acid component, and a base component shown in Table 1 was prepared. The content proportion of the solvent in the ion conductor and the total content proportion of the acid component and the base component in the ion conductor were set to the values shown in Table 1. The pH of the ion conductor was as shown in Table 1.

In the same manner as electrolytic capacitor A1 except the above, electrolytic capacitors A2 to A8 and B1 to B3 were produced and evaluated.

Electrolytic Capacitor B4

Electrolytic capacitor B4 was produced and evaluated in the same manner as electrolytic capacitor A1, except that the capacitor element was not impregnated with the solvent, but was impregnated only with the acid component and the base component.

Table 1 illustrates the evaluation results. In Table 1, a case where the melting point of the ion conductor is lower than or equal to −10° C. was indicated as "Y" and a case where the melting point of the ion conductor is higher than −10° C. was indicated as "N".

TABLE 1

| Electrolytic capacitor No. | Ion conductor | | | Total content proportion of acid component and base component in ion conductor (% by mass) | Content proportion of solvent in ion conductor (% by mass) | pH of ion conductor | Melting point of ion conductor is −10° C. or lower |
| --- | --- | --- | --- | --- | --- | --- | --- |
| | Acid component | Base component | Solvent | | | | |
| B1 | phthalic acid | 1,2,3,4-tetramethyl imidazolinium | propylene glycol | 95 | 5 | 4.5 | Y |

TABLE 1-continued

| Electrolytic capacitor No. | Ion conductor | | | | | | Evaluation | | |
|---|---|---|---|---|---|---|---|---|---|
| | Acid component | Base component | Solvent | | | | Low-temperature capacitance appearance ratio in initial stage (%) | Low-temperature capacitance appearance ratio after high-temperature holding (%) | Evaluation of voltage resistance |
| A1 | phthalic acid | 1,2,3,4-tetramethyl imidazolinium | propylene glycol | 89 | 11 | 4.5 | Y | | |
| A2 | phthalic acid | 1,2,3,4-tetramethyl imidazolinium | propylene glycol | 60 | 40 | 4.5 | Y | | |
| A3 | phthalic acid | 1,2,3,4-tetramethyl imidazolinium | propylene glycol | 50 | 50 | 4.5 | Y | | |
| A4 | phthalic acid | 1,2,3,4-tetramethyl imidazolinium | propylene glycol | 40 | 60 | 4.5 | Y | | |
| B2 | phthalic acid | 1,2,3,4-tetramethyl imidazolinium | propylene glycol | 30 | 70 | 4.5 | Y | | |
| A5 | butylnaphthalene sulfonic acid | trimethylamine | propylene glycol | 50 | 50 | 6.5 | Y | | |
| A6 | p-toluenesulfonic acid | 1,2,3,4-tetramethyl imidazolinium | propylene glycol | 50 | 50 | 6.5 | Y | | |
| A7 | p-toluenesulfonic acid | trimethylamine | propylene glycol | 50 | 50 | 6.5 | Y | | |
| A8 | phthalic acid | 1,2,3,4-tetramethyl imidazolinium | copolymer of EG and PG | 50 | 50 | 4.5 | Y | | |
| B3 | phthalic acid | 1,2,3,4-tetramethyl imidazolinium | sulfolane | 60 | 40 | 4.5 | N | | |
| B4 | phthalic acid | 1,2,3,4-tetramethyl imidazolinium | — | 100 | — | 4.5 | — | | |
| B1 | phthalic acid | 1,2,3,4-tetramethyl imidazolinium | propylene glycol | | | | 57 | 25 | OK |
| A1 | phthalic acid | 1,2,3,4-tetramethyl imidazolinium | propylene glycol | | | | 70 | 33 | OK |
| A2 | phthalic acid | 1,2,3,4-tetramethyl imidazolinium | propylene glycol | | | | 78 | 51 | OK |
| A3 | phthalic acid | 1,2,3,4-tetramethyl imidazolinium | propylene glycol | | | | 80 | 65 | OK |
| A4 | phthalic acid | 1,2,3,4-tetramethyl imidazolinium | propylene glycol | | | | 82 | 60 | OK |
| B2 | phthalic acid | 1,2,3,4-tetramethyl imidazolinium | propylene glycol | | | | 82 | 30 | NG |
| A5 | butylnaphthalene sulfonic acid | trimethylamine | propylene glycol | | | | 76 | 67 | OK |
| A6 | p-toluenesulfonic acid | 1,2,3,4-tetramethyl imidazolinium | propylene glycol | | | | 74 | 67 | OK |
| A7 | p-toluenesulfonic acid | trimethylamine | propylene glycol | | | | 72 | 68 | OK |
| A8 | phthalic acid | 1,2,3,4-tetramethyl imidazolinium | copolymer of EG and PG | | | | 79 | 68 | OK |
| B3 | phthalic acid | 1,2,3,4-tetramethyl imidazolinium | sulfolane | | | | 77 | 18 | OK |
| B4 | phthalic acid | 1,2,3,4-tetramethyl imidazolinium | — | | | | 20 | 16 | OK |

In electrolytic capacitors A1 to A8, the low-temperature capacitance appearance ratio in the initial stage and the low-temperature capacitance appearance ratio after the high-temperature holding were higher than those of electrolytic capacitors B1, B3, and B4, and excellent low-temperature characteristics were obtained in the initial stage and after the high-temperature leaving. Further, in electrolytic capacitors A1 to A8, excellent voltage resistance was obtained.

In electrolytic capacitor B1 in which the content proportion of the solvent in the ion conductor was less than or equal to 10% by mass, the ion conductor coagulated in a low-temperature environment, and the low-temperature characteristics in the initial stage and after the high-temperature holding decreased. In electrolytic capacitor B4, since the capacitor element was not impregnated with the solvent, the low-temperature characteristics at the initial stage and after the high-temperature holding decreased. In electrolytic capacitor B2 in which the total content proportion of the acid component and the base component in the ion conductor was less than 40% by mass, the voltage resistance decreased more than those in electrolytic capacitors A1 to A8. In electrolytic capacitor B3, the content proportion of the solvent in the ion conductor was more than 10% by mass, but the melting point of the ion conductor was more than −10° C., so that the low-temperature characteristics after the high-temperature holding decreased.

The present disclosure can be applied to an electrolytic capacitor that requires preferable performance in a low-temperature environment.

What is claimed is:

1. An electrolytic capacitor comprising:
   an anode body;
   a dielectric layer disposed on a surface of the anode body;
   a solid electrolyte layer that is in contact with the dielectric layer, the solid electrolyte layer including a conductive polymer; and
   an ion conductor that is liquid at room temperature, wherein:
   the ion conductor includes a solvent, an acid component, and a base component,
   a content proportion of the solvent in the ion conductor is more than 10% by mass and less than or equal to 60% by mass,
   a total content proportion of the acid component and the base component in the ion conductor is more than or equal to 40% by mass and less than 90% by mass, and
   a melting point of the ion conductor is lower than or equal to −10° C.

2. The electrolytic capacitor according to claim 1, wherein:
   the acid component includes a carboxylic acid, and
   the base component includes an amidine compound.

3. The electrolytic capacitor according to claim 1, wherein:
   a molar ratio of the acid component in the ion conductor is greater than a molar ratio of the base component in the ion conductor, and
   a pH of the ion conductor is less than or equal to 4.5.

4. The electrolytic capacitor according to claim 1, wherein:
   a content proportion of the base component in the ion conductor is more than or equal to 10% by mass, and
   a content proportion of the acid component in the ion conductor is more than or equal to 30% by mass.

5. The electrolytic capacitor according to claim 1, wherein:
   the acid component includes a sulfonic acid, and
   the base component includes at least one selected from the group consisting of a primary amine, a secondary amine, a tertiary amine, and an amidine compound.

6. The electrolytic capacitor according to claim 5, wherein:
   a molar ratio of the acid component in the ion conductor is equal to or greater than a molar ratio of the base component in the ion conductor, and
   a pH of the ion conductor is less than 7.0.

7. The electrolytic capacitor according to claim 1, wherein a melting point of the solvent is lower than or equal to −10° C.

8. The electrolytic capacitor according to claim 7, wherein the solvent includes alkylene glycol.

9. The electrolytic capacitor according to claim 8, wherein the alkylene glycol includes at least one of propylene glycol and butylene glycol.

10. The electrolytic capacitor according to claim 7, wherein the solvent includes a polyalkylene glycol.

11. The electrolytic capacitor according to claim 10, wherein the polyalkylene glycol includes a copolymer of ethylene glycol and propylene glycol.

12. The electrolytic capacitor according to claim 1, wherein:
    the ion conductor includes water, and
    a content proportion of the water in the ion conductor is more than 1% by mass and less than 10% by mass.

* * * * *